(No Model.)
S. H. STEVENS.
WEIGHING SCALE FOR ASCERTAINING THE PERCENTAGE OF IMPURITY IN GRAIN, &c.
No. 359,187. Patented Mar. 8, 1887.
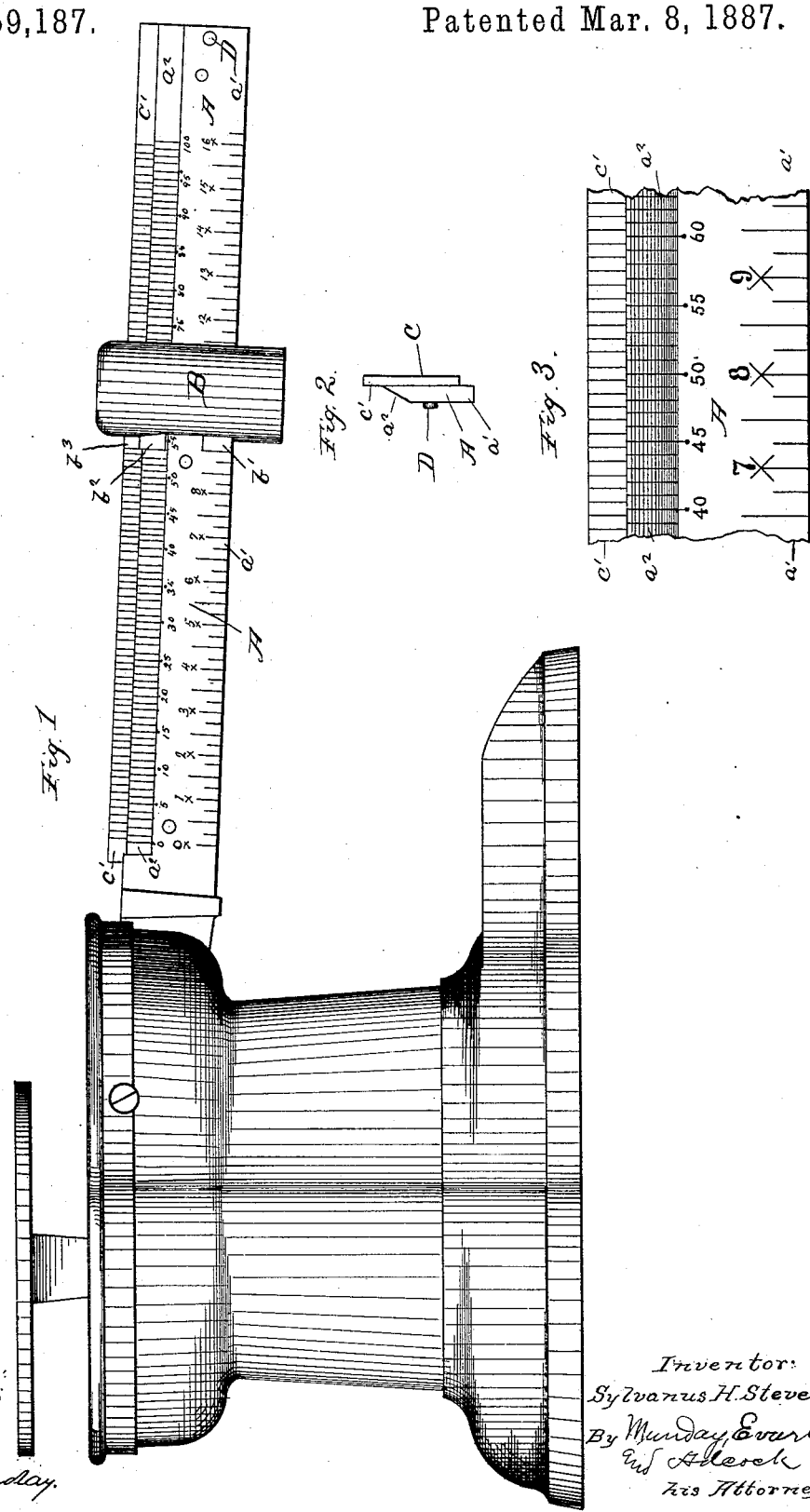

UNITED STATES PATENT OFFICE.

SYLVANUS H. STEVENS, OF CHICAGO, ILLINOIS.

WEIGHING-SCALE FOR ASCERTAINING THE PERCENTAGE OF IMPURITY IN GRAIN, &c.

SPECIFICATION forming part of Letters Patent No. 359,187, dated March 8, 1887.

Application filed July 29, 1886. Serial No. 209,389. (No model.)

*To all whom it may concern:*

Be it known that I, SYLVANUS H. STEVENS, a citizen of the United States, residing in Chicago, in the county of Cook and State of Illinois, have invented a new and useful Improvement in Percentage-Scales, of which the following is a specification.

This invention relates to improvements in scales designed for ascertaining the percentage of impurity in grain.

In scales of this class the beam is marked with the usual graduation into pounds and ounces, and also into decimals of a pound, a single poise being used for both graduations. The method of using such scales is to first weigh out a pound of the material to be examined or tested taken from the cargo at random. From the pound thus weighed up the impurities are carefully removed, and subsequently the purified grain and the impurities separated therefrom are either or both separately weighed in the same scale to ascertain the decimal fraction or percentage of a pound that either or each represents. In the scale as ordinarily constructed for this purpose I have found certain defects to exist, which in my own personal experience have proved very annoying. To test a large cargo, for example, of flaxseed, a number of samples must be weighed and reweighed with the utmost accuracy in order to arrive at a true average of the whole, as the value of the cargo—its selling price—is thereby determined, and a very slight error in the analysis may be productive of considerable loss—a loss, of course, which always falls upon the wrong person, be he buyer or seller. I have not found that inaccuracy very often results from the condition of the mechanism of the scale-balance itself, as the wearing of its pivots, &c., because this is a source of error which may be instantly ascertained and easily and speedily corrected, and is, at any rate, a constant error, if it exists at all, and not a variable one. The chief source of error, according to my observation, and the dangerous one, because it is variable in its nature, is the difficulty of reading correctly the position of the poise on the beam; and the object of the present invention is to overcome this difficulty, so far as possible, by a peculiar construction and marking of the beam.

Heretofore in scales of this character the marks subdividing the beam into ounces have been placed at the upper edge of the beam, while the marks subdividing the beam into decimals of a pound have been placed at the lower edge of the beam in hundredths of a pound. In any scale of a convenient size for use the subdivisions into hundredths are necessarily small, and being at the lower edge upon a vertical surface do not receive the best light, and such light as they do receive is more or less broken and confused by the shadows and reflections from the poise. In my improved beam I place the subdivision of the pound into ounces at the lower edge of the scale-beam, because in the ordinary use of this scale it rarely happens that the operator desires to use this scale for anything except the weighing of an entire pound, and no errors can be made in the weighing of a pound, because a stop or projection at the end of the beam against which the poise is pushed marks with absolute accuracy its position for weighing the full pound. On the other hand, the subdivisions into decimals of a pound are placed on the upper edge of the beam, where they receive the best light, are freest from shadows and reflections, are nearer to the eye, and are more conveniently, easily, and accurately read; and in order to still further increase the facility of reading the decimal-scale I mark its main subdivisions upon a slightly inclined or beveled surface, and its minor subdivisions upon a vertical blade back of the inclined surface and made, preferably, of a different metal or color than the main body of the beam. Thus upon the beveled face I mark divisions representing each one-hundredth of a pound, and upon the vertical blade a similar series of divisions into one hundred parts, the marks upon the upper blade being adjusted to subdivide the marks upon the main body of the beam, by which differential system of marking I obtain a division of the pound into two hundred parts by lines which are not any nearer together than the lines which subdivide the pound into one hundred parts, and am able by their location and the construction of the beam, as above indicated, to read the subdivisions and the position of the poise thereon with greatly-increased facility and accuracy.

In the accompanying drawings, which form a part of this specification, and in which similar letters of reference indicate like parts, I have shown at Figure 1 a side elevation of my improved scale. Fig. 2 is an end view of the beam, and Fig. 3 an enlarged view of a portion of the face of the beam.

In said drawings, A represents the main body of the beam, which I prefer to make of brass. On its face, at the lower edge, $a'$, I mark the subdivisions of one pound into ounces. The upper edge, $a^2$, is beveled, as indicated in Fig. 2, and is marked with the decimal subdivisions of the pound into one hundred parts by a series of lines traversing the entire beveled surface from edge to edge. On the back of the main body of the beam is secured a blade, C, which I prefer to make of steel or iron, the upper portion of which, $c'$, I mark with a series of subdivisions equal to the subdivisions on $a^2$, and adjust the blade on the body so that the lines on $c'$ subdivide or differentiate the lines on $a^2$.

B is the poise, perforated and sliding upon the beam. On the edge of the poise are thin metal leaves or indicators in contact with the beam, the lower one marked $b'$ for the lower subdivision, and the upper ones, $b^2$, beveled to fit the beam, and $b^3$ vertical to fit the blade for the upper subdivisions. At the end of the beam is a permanent stop, D, against which the poise is pushed when a pound is to be weighed.

In operation the poise is pushed against the stop D and the grain poured into the scale-pan (not shown) until an exact balance is obtained. The impurities being removed, the grain is returned to the pan and the percentage of loss read from the upper edge of the scale to the one-half or even one-fourth of one per cent.

I claim—

1. The scale-beam consisting of the body A, marked at its lower edge with pound and ounce subdivisions, as at $a'$, beveled at its upper edge, as at $a^2$, and marked with decimal subdivisions of a pound, substantially as specified.

2. The scale-beam consisting of the body A, marked at its lower edge with pound and ounce subdivisions, as at $a'$, beveled at its upper edge, as at $a^2$, and marked with decimal subdivisions of a pound, in combination with the blade C, having similar subdivisions, as $c'$, into one hundred parts, arranged to equally divide the subdivisions on $a^2$, substantially as specified.

3. The scale-beam consisting of the body A, marked at its lower edge with pound and ounce subdivisions, as at $a'$, beveled at its upper edge, as at $a^2$, and marked with decimal subdivisions of a pound, in combination with the blade C, having similar subdivisions, as $c'$, into one hundred parts, arranged to equally divide the subdivisions on $a^2$, and the poise B, having the indicators $b'$ $b^2$ $b^3$, projecting to one side of the poise and having their edges in a common vertical line, substantially as specified.

SYLVANUS H. STEVENS.

Witnesses:
H. M. MUNDAY,
LEN. E. CURTIS.